US009618075B2

(12) United States Patent
Martin et al.

(10) Patent No.: US 9,618,075 B2
(45) Date of Patent: Apr. 11, 2017

(54) Z-HEAD PISTON FOR DUAL CHAMBER SHOCK STRUTS

(71) Applicant: GOODRICH CORPORATION, Charlotte, NC (US)

(72) Inventors: Dennis W. Martin, Woodinville, WA (US); Charles J. Spink, Seattle, WA (US)

(73) Assignee: GOODRICH CORPORATION, Charlotte, NC (US)

( * ) Notice: Subject to any disclaimer, the term of this patent is extended or adjusted under 35 U.S.C. 154(b) by 173 days.

(21) Appl. No.: 14/521,263

(22) Filed: Oct. 22, 2014

(65) Prior Publication Data

US 2016/0116015 A1    Apr. 28, 2016

(51) Int. Cl.

| F16F 9/32 | (2006.01) |
|---|---|
| F16F 9/02 | (2006.01) |
| B64C 25/60 | (2006.01) |
| F16F 9/06 | (2006.01) |
| B64C 25/62 | (2006.01) |
| F16F 9/16 | (2006.01) |
| F16F 9/43 | (2006.01) |

(52) U.S. Cl.
CPC ........... *F16F 9/3214* (2013.01); *B64C 25/60* (2013.01); *B64C 25/62* (2013.01); *F16F 9/0227* (2013.01); *F16F 9/063* (2013.01); *F16F 9/165* (2013.01); *F16F 9/3235* (2013.01); *F16F 9/43* (2013.01)

(58) Field of Classification Search
CPC .......... F16F 9/062; F16F 9/063; F16F 9/0227; F16F 9/165; F16F 9/182; F16F 9/3221; F16F 9/3214; F16F 9/3235; F16F 9/43; B64C 25/60; B64C 25/62

See application file for complete search history.

(56) References Cited

U.S. PATENT DOCUMENTS 3,056,598 A * 10/1962 Ransom ................. B64C 25/60
                                                    267/64.26
4,660,687 A      4/1987 Williams et al.
(Continued)

FOREIGN PATENT DOCUMENTS

| FR | 2537680 | 6/1984 |
|---|---|---|
| GB | 2483734 | 3/2012 |

OTHER PUBLICATIONS

European Search Report for European Patent Application No. 15190948.8; dated Jun. 30, 2016; (9 pages).

*Primary Examiner* — Melody Burch
(74) *Attorney, Agent, or Firm* — Snell & Wilmer, L.L.P.

(57) ABSTRACT

A shock strut includes a first cylinder defining a first volume. The shock strut includes a first piston head moveably positioned within the first volume and defining a first fluid chamber and a third fluid chamber within the first volume. The shock strut includes a second cylinder defining a second volume. The shock strut includes a second piston head moveably positioned within the second volume and defining a second fluid chamber and a fourth fluid chamber within the second volume. The fourth fluid chamber is in fluid communication with the third fluid chamber. The shock strut also includes a bleed port. The shock strut also includes a tube extending from the fourth fluid chamber through the second piston head and the second fluid chamber to the bleed port.

14 Claims, 3 Drawing Sheets

(56) References Cited

U.S. PATENT DOCUMENTS

| | | | | |
|---|---|---|---|---|
| 4,907,760 A * | 3/1990 | Sealey | ............... | B64C 25/60 |
| | | | | 244/100 R |
| 5,310,139 A * | 5/1994 | Derrien | ............... | F16F 9/18 |
| | | | | 244/104 FP |
| 6,109,400 A * | 8/2000 | Ayyildiz | ............ | B60R 19/40 |
| | | | | 188/266.1 |
| 6,676,076 B1 | 1/2004 | Davies | | |
| 2005/0230887 A1 * | 10/2005 | Martinez | ............ | F16F 9/064 |
| | | | | 267/64.26 |
| 2007/0069072 A1 * | 3/2007 | Luce | ............ | B64C 25/60 |
| | | | | 244/104 FP |
| 2013/0134000 A1 * | 5/2013 | Ning | ............ | B64C 25/60 |
| | | | | 188/322.13 |

\* cited by examiner

US 9,618,075 B2

Z-HEAD PISTON FOR DUAL CHAMBER SHOCK STRUTS

FIELD

The present disclosure relates to landing gear, and more particularly, to systems and methods for increasing the serviceability of shock struts within landing gear.

BACKGROUND

Typically, an aircraft includes landing gear having wheels and shock struts. Many of these shock struts are now dual stage shock struts. These dual stage shock struts may include hydraulic fluid that benefits from servicing from time to time. With typical dual stage shock struts, the aircraft is lifted above the ground so that the shock strut can be in the fully extended position for servicing. Alternatively, the shock strut may be cycled multiple times in attempt to fully remove any trapped gas internal to the shock strut during servicing. Both of these options are time consuming and costly.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

A two stage shock strut for use in a landing gear assembly is described. The two stage shock strut includes a proximal end and a distal end opposite the proximal end. The two stage shock strut also includes a first cylinder defining a first volume proximal to the proximal end. The two stage shock strut also includes a first piston head moveably positioned within the first volume and defining a first fluid chamber and a third fluid chamber within the first volume, such that the first fluid chamber is proximal to the proximal end and the third fluid chamber is distal to the proximal end. The two stage shock strut also includes a second cylinder defining a second volume proximal to the distal end. The two stage shock strut also includes a Z piston head moveably positioned within the second volume and defining a second fluid chamber and a fourth fluid chamber within the second volume. The second fluid chamber is proximal to the distal end, the fourth fluid chamber is distal to the distal end and the fourth fluid chamber is in fluid communication with the third fluid chamber. The two stage shock strut also includes a bleed port positioned on the distal end of the two stage shock strut. The two stage shock strut also includes a tube extending from the fourth fluid chamber through the Z piston head and the second fluid chamber to the bleed port.

Also described is a two stage shock strut. The two stage shock strut includes a proximal end and a distal end opposite the proximal end. The two stage shock strut also includes a first cylinder defining a first volume proximal to the proximal end. The two stage shock strut also includes a first piston head moveably positioned within the first volume and defining a first fluid chamber and a third fluid chamber within the first volume, such that the first fluid chamber is proximal to the proximal end and the third fluid chamber is distal to the proximal end. The two stage shock strut also includes a second cylinder defining a second volume proximal to the distal end and positioned on a line extending from the proximal end to the distal end. The two stage shock strut also includes a bleed tube positioned within the second cylinder. The two stage shock strut also includes a Z piston head moveably positioned within the second volume and defining a second fluid chamber and a fourth fluid chamber within the second volume. The second fluid chamber is proximal to the distal end, the fourth fluid chamber is distal to the distal end and the fourth fluid chamber is in fluid communication with the third fluid chamber. The Z piston head has a first part that separates the second fluid chamber from the fourth fluid chamber and a second part that encloses the bleed tube, is perpendicular to the first part and extends towards the distal end of the two stage shock strut from the first part. The two stage shock strut also includes a bleed port in fluid communication with the fourth fluid chamber via the bleed tube.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
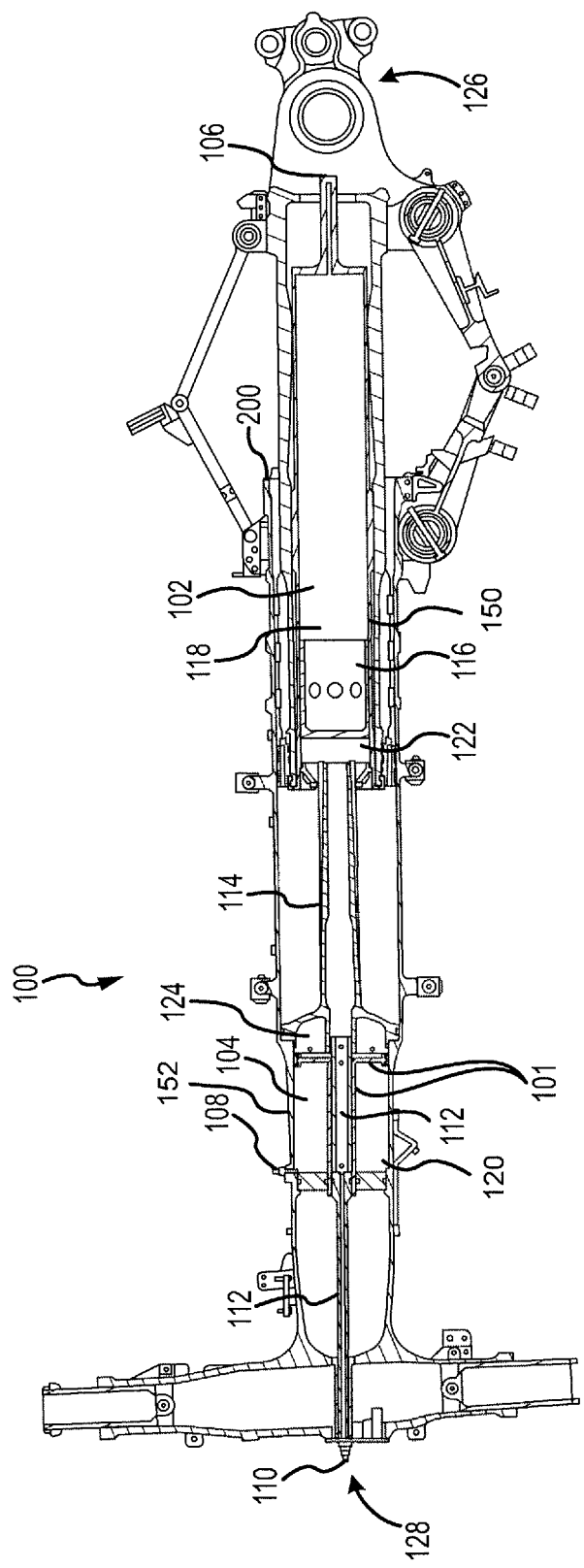
FIG. 1 illustrates a two stage shock strut for use in landing gear of an aircraft, in accordance with various embodiments.

FIG. 1 illustrates a two stage shock strut 100 for use in landing gear of an aircraft. Two stage shock strut 100 includes a proximal end 126 and a distal end 128. In various embodiments, proximal end 126 is attached to at least one wheel and distal end 128 is attached to the body of an aircraft. In various embodiments, proximal end 126 may be attached to the body of an aircraft and distal end 128 may be attached to at least one wheel.

Two stage shock strut 100 may include a first stage and a second stage. The first stage may include a first cylinder 150 that defines a first volume 102. An axis of the first cylinder 150 may extend from proximal end 126 through distal end 128. The first stage may also include a first stage piston head 116 that separates the first volume 102 into the first fluid chamber 118 and the third fluid chamber 122. In various embodiments, first fluid chamber 118 may be filled with a gas, such as air or nitrogen. In FIG. 1, two stage shock strut 100 is illustrated in a fully extended position. Stated another way, two stage shock strut 100 in a fully extended position includes the maximum distance between proximal end 126 and distal end 128.

Opposite first stage piston head 116 from the first fluid chamber 118 is third fluid chamber 122. Third fluid chamber 122 may be configured to be filled at least partially with a hydraulic fluid. First stage piston head 116 may be a floating piston head such that it can move relative to first fluid chamber 118 and third fluid chamber 122.

When sufficient force is applied to at least one of proximal end 126 or distal end 128, first stage piston head 116 will translate relative to first fluid chamber 118 in the direction of proximal end 126. As first stage piston head 116 translates in the direction of proximal end 126, gas in first fluid chamber 118 and/or hydraulic fluid in third fluid chamber may resist the translation and thus dampen applied shock.

The second stage of two stage shock strut 100 may include a second cylinder 152 that defines a second volume 104. Second cylinder 152 may be centered on the axis of first cylinder 150. The second stage also includes a Z piston head 101 that separates second volume 104 into a second fluid chamber 120 and a fourth fluid chamber 124. Second fluid chamber 120 may include a fluid such as nitrogen or air. Opposite Z piston head 101 from second fluid chamber 120 is a fourth fluid chamber 124. Fourth fluid chamber 124 may be configured to be at least partially filled with a hydraulic fluid and be in fluid communication with third fluid chamber 122. Z piston head 101 may be a floating piston such that it can move relative to second fluid chamber 120 and fourth fluid chamber 124.

When sufficient force is applied to at least one of proximal end 126 or distal end 128, Z piston head 101 will translate relative to second fluid chamber 120 in the direction of distal end 128. As Z piston head 101 translates in the direction of distal end 128, gas in second fluid chamber 120 and fluid in fourth fluid chamber 124 may resist the translation and thus dampen applied shock.

Third fluid chamber 122 may be in fluid communication with fourth fluid chamber 124 via a metering pin 114. Metering pin 114 may be a tube or other hollow device capable of transferring fluid. Metering pin 114 may limit the flow of hydraulic fluid between third fluid chamber 122 and fourth fluid chamber 124 during a dynamic event such as a landing or a takeoff of the aircraft. Stated another way, the metering pin 114 may prevent a hydraulic fluid flow rate from rising above a predetermined flow rate (where flow rate is defined as volume per second).

Fourth fluid chamber 124 may be in fluid communication with a bleed tube 112. Bleed tube 112 may be a tube or other hollow device capable of transferring fluid. Bleed tube 112 may be positioned within second fluid chamber 120 and fourth fluid chamber 124. Bleed tube 112 may be adapted to allow hydraulic fluid to be disposed from fourth fluid chamber 124 towards a hydraulic bleed port 110. Hydraulic bleed port 110 may be sealable. For example, when sealed, hydraulic bleed port 110 may not allow hydraulic fluid to exit hydraulic bleed port 110. When unsealed, hydraulic bleed port 110 may allow hydraulic fluid traveling through bleed tube 112 from fourth fluid chamber 124 to evacuate via hydraulic bleed port 110.

Two stage shock strut 100 may include a fill port valve. Fill port valve 200 may be, for example, a changeover valve or other type of fill port valve. Fill port valve 200 may be in fluid communication with third fluid chamber 122 and adapted to allow fluid to be pumped into third fluid chamber 122. Fill port valve 200 may be sealable. For example, when sealed, hydraulic fluid may not be able to enter or exit third fluid chamber 122 via fill port valve 200. However, when unsealed, hydraulic fluid may be displaced via fill port valve 200 such that hydraulic fluid may be pumped into third fluid chamber 122 via fill port valve 200.

First fluid chamber 118 may be in fluid communication with air charge port 106. Air charge port 106 may be in fluid communication with first fluid chamber 118. Air charge port 106 may be sealable, such that when sealed, fluid may not be displaced through air charge port 106 and when unsealed, fluid may be displaced through air charge port 106. Air charge port 106 may allow a fluid, such as nitrogen gas or air, to be pumped into first fluid chamber 118.

Second fluid chamber 120 may include an air charge port 108. Air charge port 108 may act in a similar fashion to air charge port 106. Air charge port 108 may be sealable and allow a fluid, such as nitrogen or air, to be pumped into second fluid chamber 120.

When a typical two stage shock strut of an aircraft may benefit from servicing, the aircraft is typically lifted up so that the two stage shock strut is in a fully extended position. This is to ensure that the hydraulic fluid chamber or chambers contain the proper amount of hydraulic fluid. However, it is a costly and time consuming process to lift up the aircraft in order to service the hydraulic fluid. Two stage shock strut 100, however, includes various features which allow hydraulic fluid of two stage shock strut 100 to be serviced while two stage shock strut 100 is in a compressed position (i.e., without lifting up the aircraft).

Figure 2:
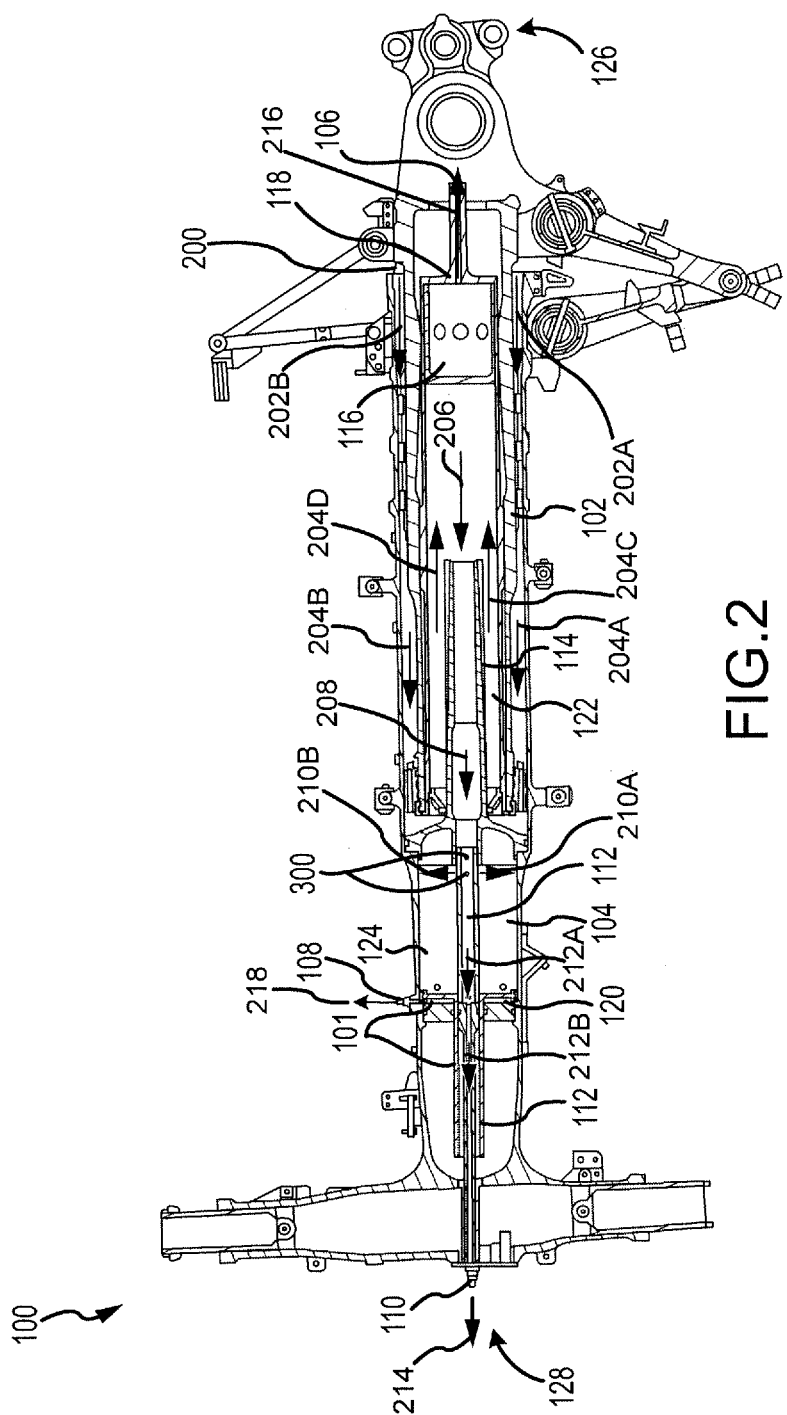
FIG. 2 illustrates a shock strut in a compressed position, in accordance with various embodiments.

FIG. 2 illustrates two stage shock strut 100 in a compressed position. As illustrated, first stage piston head 116 is positioned proximate proximal end 126 of two stage shock strut 100. When two stage shock strut 100 is compressed in this fashion, the volume of first fluid chamber 118 is reduced. Also, Z piston head 101 is proximate distal end 128 of two stage shock strut 100. When two stage shock strut 100 is compressed, the volume of third fluid chamber 122 and fourth fluid chamber 124 is maximized and the volume of first fluid chamber 118 and second fluid chamber 120 is minimized. This compressed position may be achieved when aircraft is resting on landing gear.

Unlike traditional two stage shock struts, hydraulic fluid within two stage shock strut 100 can be serviced while in a compressed position. In order to service the hydraulic fluid, the fluid in first fluid chamber 118 and second fluid chamber 120 are first released through air charge port 106, as illustrated by arrow 216, and air charge port 108, as illustrated by arrow 218. When the aircraft is resting on the landing gear and fluid is released from first fluid chamber 118 and second fluid chamber 120, two stage shock strut 100 will become fully compressed (such as in FIG. 2).

After fluid is released from first fluid chamber 118 and second fluid chamber 120, the weight of the aircraft may compress the first stage and the second stage. When this happens, hydraulic fluid may be pumped into third fluid chamber 122 and fourth fluid chamber 124 via fill port valve 200. When the third fluid chamber 122 and fourth fluid chamber 124 are full of hydraulic fluid, the hydraulic fluid within third fluid chamber 122 and fourth fluid chamber 124 may become pressurized. When this hydraulic fluid is pressurized, first stage piston head 116 and Z piston head 101 will be forced in the fully compressed positions. When fully compressed, first stage piston head 116 is at a position where it is mechanically prevented (as opposed to being prevented due to resistance applied via hydraulic fluid and/or gas) from being displaced any farther towards proximal end 126. When fully compressed, Z piston head 101 is at a position where it is mechanically prevented (as opposed to being prevented due to resistance applied via hydraulic fluid and/or gas) from being displaced any farther towards distal end 128. Hydraulic bleed port 110 may then be opened, releasing the hydraulic fluid.

Arrows in FIG. 2 illustrate the flow of hydraulic fluid within two stage shock strut 100. As illustrated by arrows 202, hydraulic fluid is pumped into fill port valve 200. The hydraulic fluid then enters third fluid chamber 122, as illustrated by arrows 204, where it then becomes displaced into metering pin 114, as illustrated by arrow 206. The hydraulic fluid is then displaced into bleed tube 112, as illustrated by arrow 208, where it is released into fourth fluid chamber 124 via holes 300 of bleed tube 112, as illustrated by arrows 210. The pressurized hydraulic fluid within third fluid chamber 122, will force first stage piston head 116 into a fully compressed position, such that first stage piston head 116 cannot mechanically be displaced any farther towards proximal end 126, as air charge port 106 is unsealed, allowing gas within first fluid chamber 118 to freely exit first fluid chamber 118. Similarly, hydraulic fluid within fourth fluid chamber 124 forces Z piston head 101 into a fully compressed position, such that Z piston head 101 cannot be mechanically displaced any farther towards distal end 128, as air charge port 108 is unsealed, allowing fluid to freely exit second fluid chamber 120.

Once two stage shock strut 100 is fully compressed, hydraulic bleed port 110 may be unsealed. When hydraulic bleed port 110 is unsealed, hydraulic fluid may travel through bleed tube 112, as indicated by arrow 212, where it then flows out hydraulic bleed port 110, as indicated by arrow 214. Initially, some non-hydraulic fluid, such as compressed or uncompressed nitrogen or air, may exit through hydraulic bleed port 110. This non-hydraulic fluid may have leaked into third fluid chamber 122 and/or fourth fluid chamber 124 from first fluid chamber 118 and/or second fluid chamber 120. Eventually, the hydraulic fluid causes Z piston head 101 to extend upwards such that fourth fluid chamber 124 is fully extended. When this non-hydraulic fluid stops flowing through hydraulic bleed port 110 and only hydraulic fluid is flowing from hydraulic bleed port 110, it is known that third fluid chamber 122 and fourth fluid chamber 124 are fully extended and full of hydraulic fluid.

When two stage shock strut 100 contains the proper amount of hydraulic fluid, hydraulic bleed port 110 may be sealed so that no additional hydraulic fluid can be displaced from third fluid chamber 122 or fourth fluid chamber 124. At this point, gas, such as compressed or uncompressed nitrogen or air, may be displaced into first fluid chamber 118 via air charge port 106. Gases may be pumped into first fluid chamber 118 until first fluid chamber 118 is pressurized to a desired fluid pressure. When first fluid chamber 118 is properly pressurized, fluid may stop being pumped into first fluid chamber 118 and air charge port 106 may be closed.

Similarly, fluid may be pumped into second fluid chamber 120 via air charge port 108. This fluid may be pumped into second fluid chamber 120 until second fluid chamber 120 is pressurized to the desired pressure. When this happens, the non-hydraulic fluid may stop being pumped into second fluid chamber 120 and air charge port 108 may be closed. At this point, two stage shock strut 100 is properly serviced as it contains a desired amount of hydraulic fluid and first fluid chamber 118 and second fluid chamber 120 are pressurized to a desired amount. All these steps may be performed while the aircraft is resting on its landing gear.

In various embodiments, fluid may be pumped into second fluid chamber 120 before first fluid chamber 118 based on the air curve requirements of shock strut 100. For example, if second fluid chamber 120 is designed to bottom out before first fluid chamber 118, it may be preferable to fill second fluid chamber 120 prior to filling first fluid chamber 118.

In the manner described above, two stage shock strut 100 may have its hydraulic fluid serviced without requiring the aircraft to be lifted above the ground. This is a simpler and less expensive method for servicing the aircraft than jacking up the aircraft in order to fully extend two stage shock strut 100.

Figure 3:
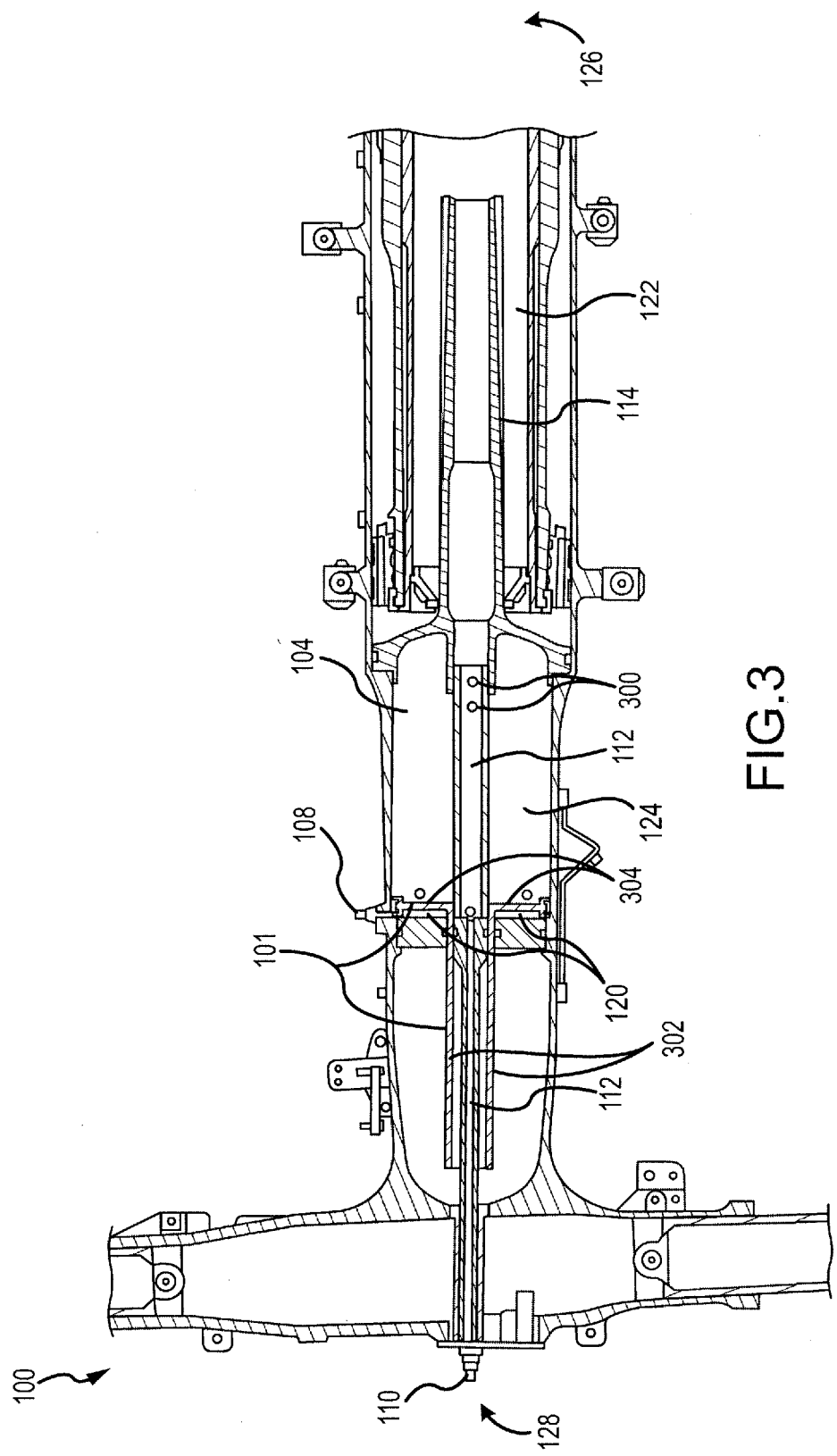
FIG. 3 illustrates an enlarged view of a second stage of a shock strut, in accordance with various embodiments.

FIG. 3 illustrates an enlarged view of the second stage of two stage shock strut 100. FIG. 3 provides a closer view of Z piston head 101. Z piston head 101 includes a first portion 302 that extends towards distal end 128 from second fluid chamber 120. First portion 302 is parallel to bleed tube 112 and surrounds bleed tube 112. Z piston head 101 also includes a second portion 304. Second portion 304 is perpendicular to first portion 302. Second portion 304 is positioned between second fluid chamber 120 and fourth fluid chamber 124. Second portion 304 surrounds bleed tube 112 so that Z piston head 101 may separate second fluid chamber 120 from fourth fluid chamber 124 while allowing bleed tube 112 to be in fluid communication with fourth fluid chamber 124. First portion 302 and second portion 304 may be integral to Z piston head 101. In various embodiments, first portion 302 and second portion 304 may be separate components.

Z piston head 101 may move freely relative to second fluid chamber 120 and fourth fluid chamber 124. The shape of Z piston head 101 allows the pressure of hydraulic fluid in fourth fluid chamber 124 to move Z piston head 101 towards distal end 128 of two stage shock strut 100. This causes fluid to drain from second fluid chamber 120 so that two stage shock strut 100 can be fully compressed for servicing hydraulic fluid. Once the hydraulic fluid has been serviced, fluid may be displaced into second fluid chamber 120 via air charge port 108. Once fluid within second fluid chamber 120 is pressurized, the second stage becomes extended. Fluid may be displaced into second fluid chamber 120, thus pressurizing second fluid chamber 120, until the second stage of two stage shock strut 100 is extended a predetermined amount, indicating that a proper amount of fluid and pressure is positioned within second fluid chamber 120.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A two stage shock strut for use in a landing gear assembly, comprising:
    a proximal end and a distal end opposite the proximal end;
    a first cylinder defining a first volume proximal to the proximal end;
    a first piston head moveably positioned within the first volume and defining a first fluid chamber and a third fluid chamber within the first volume, such that the first fluid chamber is proximal to the proximal end and the third fluid chamber is distal to the proximal end relative to the first fluid chamber;
    a second cylinder defining a second volume proximal to the distal end;
    a Z piston head moveably positioned within the second volume and defining a second fluid chamber and a fourth fluid chamber within the second volume, such that the second fluid chamber is proximal to the distal end, the fourth fluid chamber is positioned between the second fluid chamber and the third fluid chamber, and the fourth fluid chamber is in fluid communication with the third fluid chamber;
    a bleed port positioned on the distal end of the two stage shock strut;
    a metering pin positioned between the third fluid chamber and the fourth fluid chamber and in fluid communication with the third fluid chamber and the fourth fluid chamber; and
    a tube extending from the fourth fluid chamber through the Z piston head and the second fluid chamber to the bleed port such that fluid from the third fluid chamber can flow through the bleed port via the metering pin and the tube.

2. The two stage shock strut of claim 1, wherein fluid may flow from any part of the fourth fluid chamber to any other part of the fourth fluid chamber.

3. The two stage shock strut of claim 1, wherein the metering pin is configured to limit a flow of hydraulic fluid between the third fluid chamber and the fourth fluid chamber.

4. The two stage shock strut of claim 1, wherein the tube includes a bleed tube positioned within the second cylinder and in fluid communication with the metering pin.

5. The two stage shock strut of claim 4, wherein the bleed tube defines a hole positioned within the fourth fluid chamber such that fluid may be displaced between the fourth fluid chamber and the bleed tube via the hole.

6. The two stage shock strut of claim 5, wherein fluid can flow from the third fluid chamber through the metering pin to the fourth fluid chamber, from the fourth fluid chamber through the bleed tube, from the bleed tube through the bleed port to a position external to the two stage shock strut.

7. The two stage shock strut of claim 1, further comprising an air charge port in fluid communication with the first fluid chamber such that a fluid may be pumped into the first fluid chamber via the air charge port.

8. The two stage shock strut of claim 1, further comprising an air charge port in fluid communication with the second fluid chamber such that a fluid may be pumped into the second fluid chamber via the air charge port.

9. The two stage shock strut of claim 1, further comprising a fill port valve in fluid communication with the third fluid chamber such that a fluid may be pumped into the third fluid chamber via the fill port valve and may flow from the third fluid chamber to the fourth fluid chamber via the metering pin.

10. The two stage shock strut of claim 1, wherein an axis of the first cylinder aligns with an axis of the second cylinder.

11. The two stage shock strut of claim 1, wherein the Z piston head includes a first part that separates the second fluid chamber from the fourth fluid chamber and a second part that is perpendicular to the first part and extends towards the distal end of the two stage shock strut from the first part.

12. The two stage shock strut of claim 11, wherein the tube includes a bleed tube positioned within the second cylinder, wherein the second part encloses the bleed tube.

13. A two stage shock strut, comprising:
    a proximal end and a distal end opposite the proximal end;
    a first cylinder defining a first volume proximal to the proximal end;
    a first piston head moveably positioned within the first volume and defining a first fluid chamber and a third fluid chamber within the first volume, such that the first fluid chamber is proximal to the proximal end and the third fluid chamber is distal to the proximal end relative to the first fluid chamber;
    a second cylinder defining a second volume proximal to the distal end and positioned on a line extending from the proximal end to the distal end;
    a bleed tube positioned within the second cylinder;

a Z piston head moveably positioned within the second volume and defining a second fluid chamber and a fourth fluid chamber within the second volume, such that the second fluid chamber is proximal to the distal end, the fourth fluid chamber is positioned between the second fluid chamber and the third fluid chamber, and the fourth fluid chamber is in fluid communication with the third fluid chamber, the Z piston head having a first part that separates the second fluid chamber from the fourth fluid chamber and a second part that encloses the bleed tube, is perpendicular to the first part and extends towards the distal end of the two stage shock strut from the first part;

a metering pin positioned between the third fluid chamber and the fourth fluid chamber and in fluid communication with the third fluid chamber and the fourth fluid chamber; and a bleed port in fluid communication with the fourth fluid chamber via the bleed tube such that fluid from the third fluid chamber can flow through the bleed port via the metering pin and the bleed tube.

14. The two stage shock strut of claim 13, wherein fluid may flow from any part of the fourth fluid chamber to any other part of the fourth fluid chamber.

* * * * *